(12) United States Patent
Khan et al.

(10) Patent No.: US 12,717,823 B1
(45) Date of Patent: Aug. 25, 2026

(54) EFFICIENT FORMULA COMPUTATION METHOD FOR FORMULAS INCLUDING DEPENDENT OBJECTS IN AN EXTENSIBLE DATA MODEL FOR A HIGHLY PERFORMANT AND SCALABLE MULTI-TENANT APPLICATION

(71) Applicant: Conga Corporation, Broomfield, CO (US)

(72) Inventors: Haseebulla M. Khan, San Ramon, CA (US); Gaurav Prajapati, Ahmedabad (IN); Ramesh Chauhan, Ahmedabad (IN)

(73) Assignee: Conga Corporation, Houston, TX (US)

( * ) Notice: Subject to any disclaimer, the term of this patent is extended or adjusted under 35 U.S.C. 154(b) by 0 days.

(21) Appl. No.: 19/174,252

(22) Filed: Apr. 9, 2025

Related U.S. Application Data

(60) Provisional application No. 63/729,208, filed on Dec. 6, 2024.

(51) Int. Cl.
*G06F 16/00* (2019.01)
*G06F 16/28* (2019.01)

(52) U.S. Cl.
CPC .................................. *G06F 16/288* (2019.01)

(58) Field of Classification Search
CPC ..................................................... G06F 16/288
See application file for complete search history.

(56) References Cited

U.S. PATENT DOCUMENTS 11,048,728 B2 * 6/2021 Heinle .................. G06F 16/212
11,409,756 B1 * 8/2022 Park ...................... G06F 16/254
11,720,563 B1 * 8/2023 Khan .................... H04L 67/568
707/718
11,755,559 B1 * 9/2023 Tankersley .......... G06F 3/04847
707/694
12,229,099 B1 * 2/2025 Bin ..................... G06F 16/2246
2009/0228431 A1 * 9/2009 Dunagan ................. H04L 67/63
2012/0047239 A1 * 2/2012 Donahue ............... G06F 9/5072
709/220
2012/0317146 A1 * 12/2012 Brooks .................. G06F 8/658
707/E17.001

(Continued)

*Primary Examiner* — Noosha Arjomandi
(74) *Attorney, Agent, or Firm* — Lessani Law Group, PC

(57) ABSTRACT

An efficient, scalable method, system, and computer program for computing formula fields referencing dependent object fields in databases with extensible data models, particularly NoSQL systems, is provided. The method involves receiving a formula expression for a primary object's formula field that references fields from dependent objects. It includes creating detailed metadata that defines internal runtime fields for each dependent-object-field and specifies their relationships. Upon a trigger event, such as record creation or update, a dependent-object-field metadata tree is constructed and traversed. The traversal retrieves and temporarily stores dependent object field values in internal runtime fields. A formula expression is evaluated using these stored runtime values to compute the formula field value, which is then written back into the data record. This metadata-driven approach, leveraging parallel processing and caching, significantly enhances computational performance, making it suitable for large-scale, high-performance SaaS applications.

21 Claims, 7 Drawing Sheets

(56) References Cited

U.S. PATENT DOCUMENTS

| | | | | |
|---|---|---|---|---|
| 2014/0040294 | A1* | 2/2014 | An | G06F 16/24<br>707/756 |
| 2014/0289391 | A1* | 9/2014 | Balaji | H04L 67/306<br>709/224 |
| 2015/0242197 | A1* | 8/2015 | Alfonso | G06F 8/65<br>717/173 |
| 2015/0242199 | A1* | 8/2015 | Goldstein | G06F 8/71<br>717/120 |
| 2015/0264014 | A1* | 9/2015 | Budhani | H04L 63/105<br>726/12 |
| 2015/0331927 | A1* | 11/2015 | Venkatesan | G06F 16/278<br>707/810 |
| 2018/0024901 | A1* | 1/2018 | Tankersley | G06F 11/3006<br>707/694 |
| 2019/0087835 | A1* | 3/2019 | Schwed | G06F 21/6227 |
| 2019/0205455 | A1* | 7/2019 | Jugel | G06F 16/24 |
| 2019/0220529 | A1* | 7/2019 | Eberlein | G06F 16/211 |
| 2020/0125550 | A1* | 4/2020 | Katkade | G06F 16/2455 |
| 2020/0257516 | A1* | 8/2020 | Totale | G06F 8/71 |
| 2023/0099916 | A1* | 3/2023 | Teyer | G06F 11/0754<br>714/3 |
| 2023/0409731 | A1* | 12/2023 | Voelker | H04L 9/0894 |
| 2024/0311399 | A1* | 9/2024 | Mccluskey | G06F 16/248 |
| 2025/0310300 | A1* | 10/2025 | Choudhry | H04L 63/0236 |
| 2025/0378405 | A1* | 12/2025 | Pandurangi | G06Q 10/0633 |

* cited by examiner

FIG. 2

EFFICIENT FORMULA COMPUTATION METHOD FOR FORMULAS INCLUDING DEPENDENT OBJECTS IN AN EXTENSIBLE DATA MODEL FOR A HIGHLY PERFORMANT AND SCALABLE MULTI-TENANT APPLICATION

RELATED APPLICATIONS

This application claims the benefit of U.S. Provisional Application No. 63/729,208 filed on Dec. 6, 2024, and titled "Efficient Formula Computation Method for Dependent Objects in an Extensible Data Model for a Highly Performant and Scalable Multi-Tenant SaaS Application," the contents of which are incorporated by reference herein as if fully disclosed herein.

BACKGROUND OF THE INVENTION

1. Field of the Invention

This invention relates generally to data storage and retrieval for a multi-tenant application, and more specifically to efficient formula computation for formulas including dependent objects in an extensible data model for a highly-performant and scalable multi-tenant application.

2. Description of the Background Art

With the rise of NoSQL database systems, modern applications have increasingly adopted flexible-schema databases to handle large-scale, semi-structured or structured denormalized data. NoSQL databases offer advantages in horizontal scalability, high availability, and flexible data storage compared to traditional relational databases (RDBMS). However, these benefits come at the cost of lacking certain features that are inherent to relational databases, such as native support for dependent object formula field computations that span multiple objects.

In relational databases, formula fields or computed fields are easily defined using structured query language (SQL) that can fetch and compute data across multiple tables through joins. However, in NoSQL databases or data fetches from object storage such as blob storage, the absence of strict schema enforcement like relationships makes it challenging to compute fields that require data from different objects.

The primary challenge lies in the fact that NoSQL databases are optimized for denormalization and retrieval of hierarchical or dependent data, require data from multiple objects to be fetched. As a result, performing formula computations that span across multiple objects can lead to performance bottlenecks due to:

- Lack of efficient dependent object queries: Unlike SQL databases, NoSQL systems do not natively support efficient joins, making it difficult to compute formula fields involving multiple objects.
- Scalability constraints: Even though NoSQL databases are designed to scale horizontally, performing computations across multiple distributed objects can become a scalability issue, especially when dealing with large data volumes.
- Complexity in data aggregation: NoSQL databases generally lack built-in tools for the aggregation of data across collections, which makes dependent object formula computations cumbersome and slow.

Thus, there is a need for an efficient mechanism to perform formula field computations that span across multiple objects in a NoSQL database system. The methods disclosed herein are a solution to this problem, optimizing the way dependent object computations are handled within NoSQL architectures. This technique can also be used where SQL like architecture exists where scalability and performance are both important.

SUMMARY OF THE DISCLOSURE

The present disclosure provides an efficient and scalable computer-implemented method for computing formula fields within a database having an extensible data model. The method disclosed herein addresses the formula computation limitations of NoSQL database architectures in that formulas involving dependent objects can be efficiently computed without the use of joins. The method can also be used to optimize performance in a SQL database.

The method involves receiving a formula expression for a formula field associated with a particular data object for an application, where this formula references one or more fields from other dependent data objects. Following this, a computer system that executes the application creates a metadata file that: (1) defines internal runtime fields for each dependent object field used in the formula, and (2) explicitly outlines the dependency relationship between the primary data object and these dependent data objects.

Upon the occurrence of a trigger event to compute the formula value for a record ("the primary data record"), such as the creation, update, or retrieval of the record, the system constructs a dependent-object-field metadata tree from the metadata file. This structured metadata tree provides an organized representation of the dependencies between fields across objects. The system then traverses this tree structure to fetch the necessary values for the record for each dependent object field, temporarily storing these retrieved values in internal runtime fields associated with the primary data record.

The system evaluates the original formula expression using the internally stored runtime values to compute the final formula field value for the primary data record. Once calculated, the computed formula field value is then written back to the record.

Formula field values for multiple records may be computed in parallel, and internal runtime field values may be cached. By employing parallel processing and intelligent caching technique throughout these steps, the method significantly enhances computational efficiency, responsiveness, and overall scalability, making it highly suitable for high-performance, large-scale SaaS environments.

BRIEF DESCRIPTION OF THE DRAWINGS

FIG. 2 is a flowchart that illustrates an example of the formula field authoring flow.

DETAILED DESCRIPTION OF THE PREFERRED EMBODIMENTS

The present disclosure relates to efficient formula calculation for formulas including dependent objects in an extensible data model for a highly performant and scalable application. The methods described herein are performed by a computer system that executes an application that uses the data model, such as multi-tenant, cloud-based SaaS application ("the system"). The system may include or access servers, storage systems, networks, operating systems, and databases.

Figure 1:
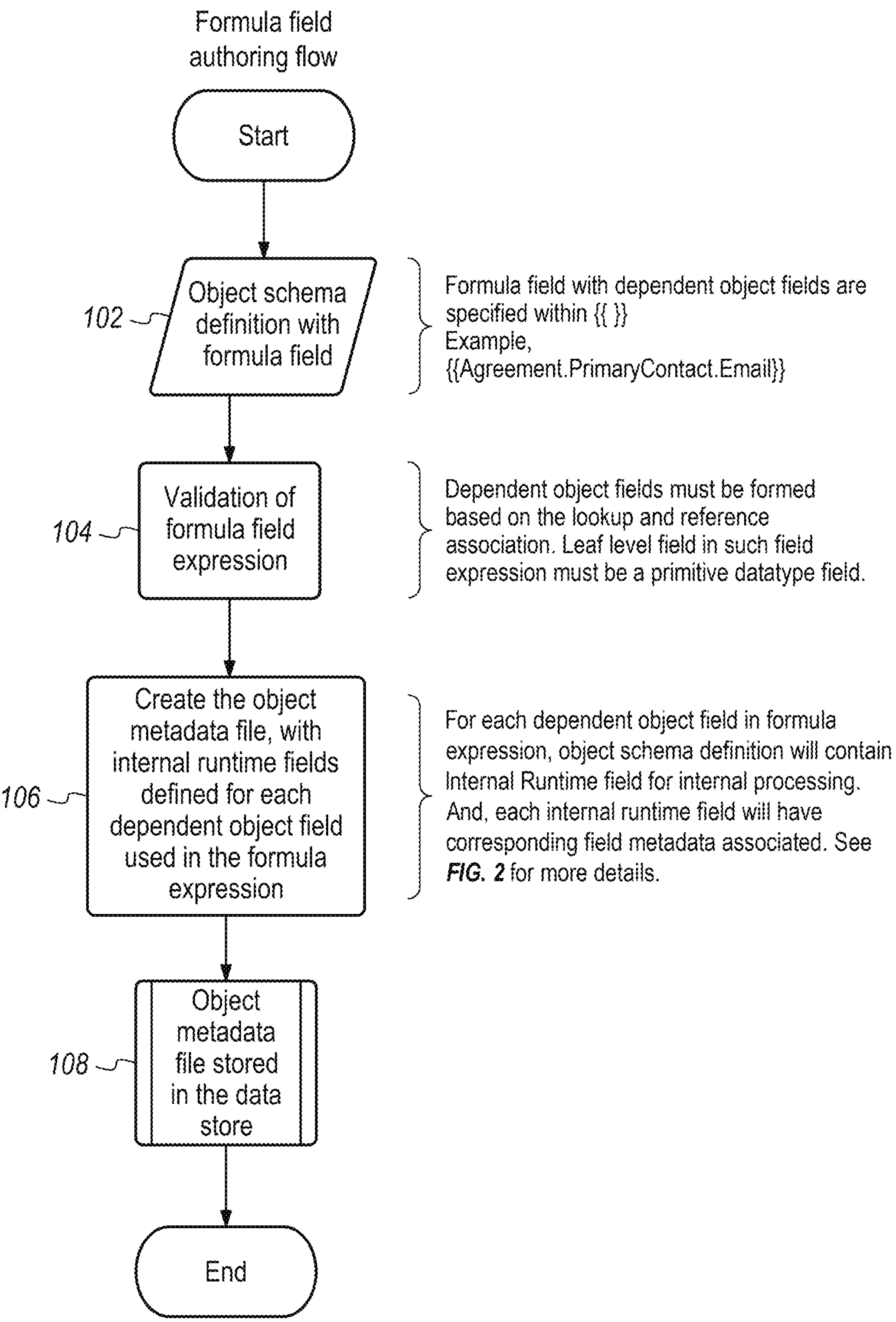
FIG. 1 is a flowchart that illustrates the formula field authoring flow.
Figure 2:
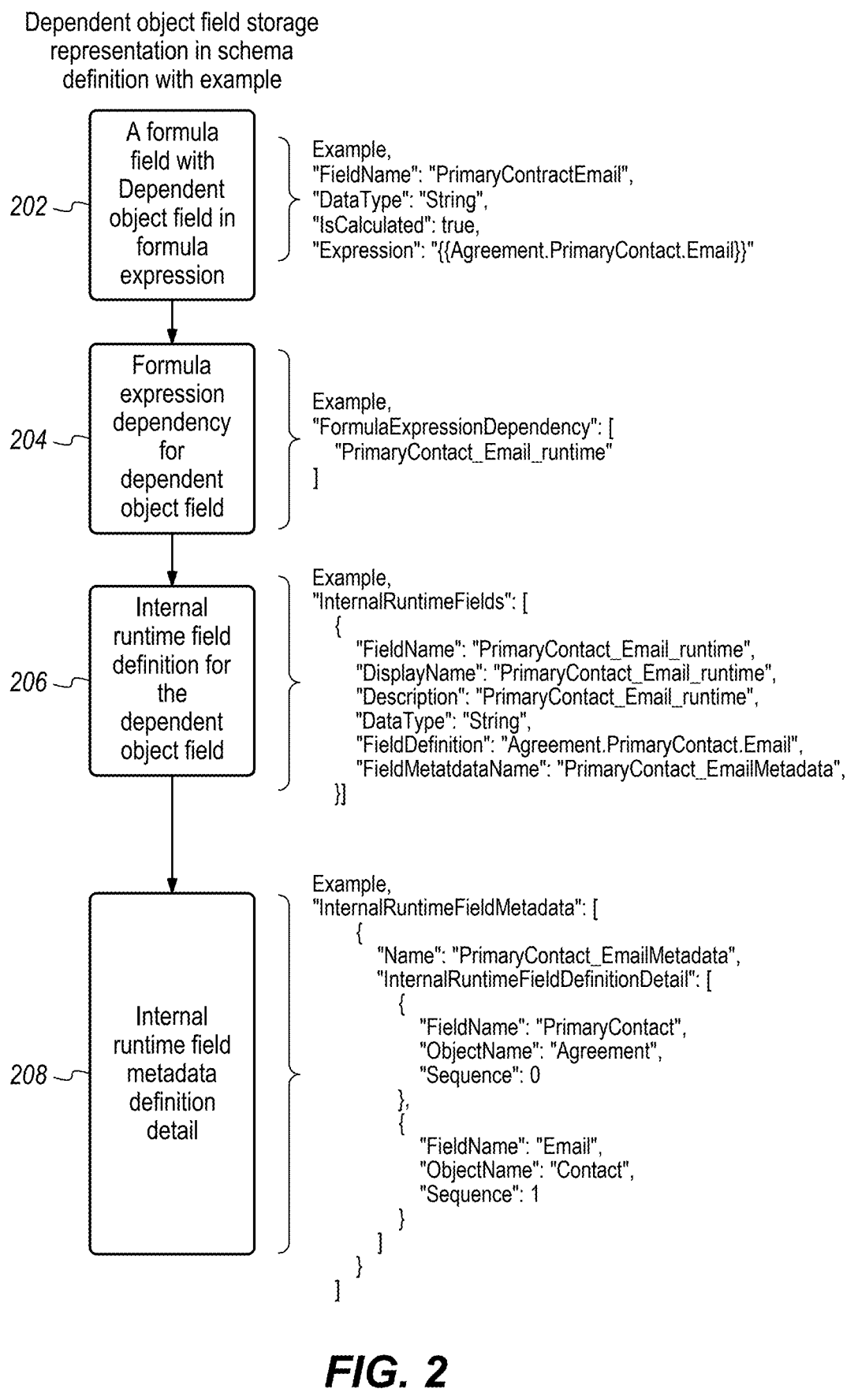

Formula Field Definition and Metadata Creation (FIGS. 1 and 2)

As illustrated in FIG. 1, the formula computation process begins with the receipt of a formula expression for a formula field of a data object (step 102). The system validates the expression to ensure syntactic accuracy and compatibility with existing data object schema (step 104). Upon successful validation, the system generates a metadata file for the formula field (step 106). This file includes explicitly defined internal runtime fields for each dependent object field used in the formula expression, as well as dependency metadata outlining the relationship between data objects specified in the formula expression. This metadata file is then stored within the data store to facilitate efficient future access (step 108).

FIG. 2 illustrates an example of the process of FIG. 1. In step 202, a formula expression is received (see example to the right of box 202). In step 204, a dependent object field is identified. In step 206, an internal runtime field is created for the dependent object field. In step 208, a metadata file with the internal runtime field and the dependency metadata is created.

Figure 3:
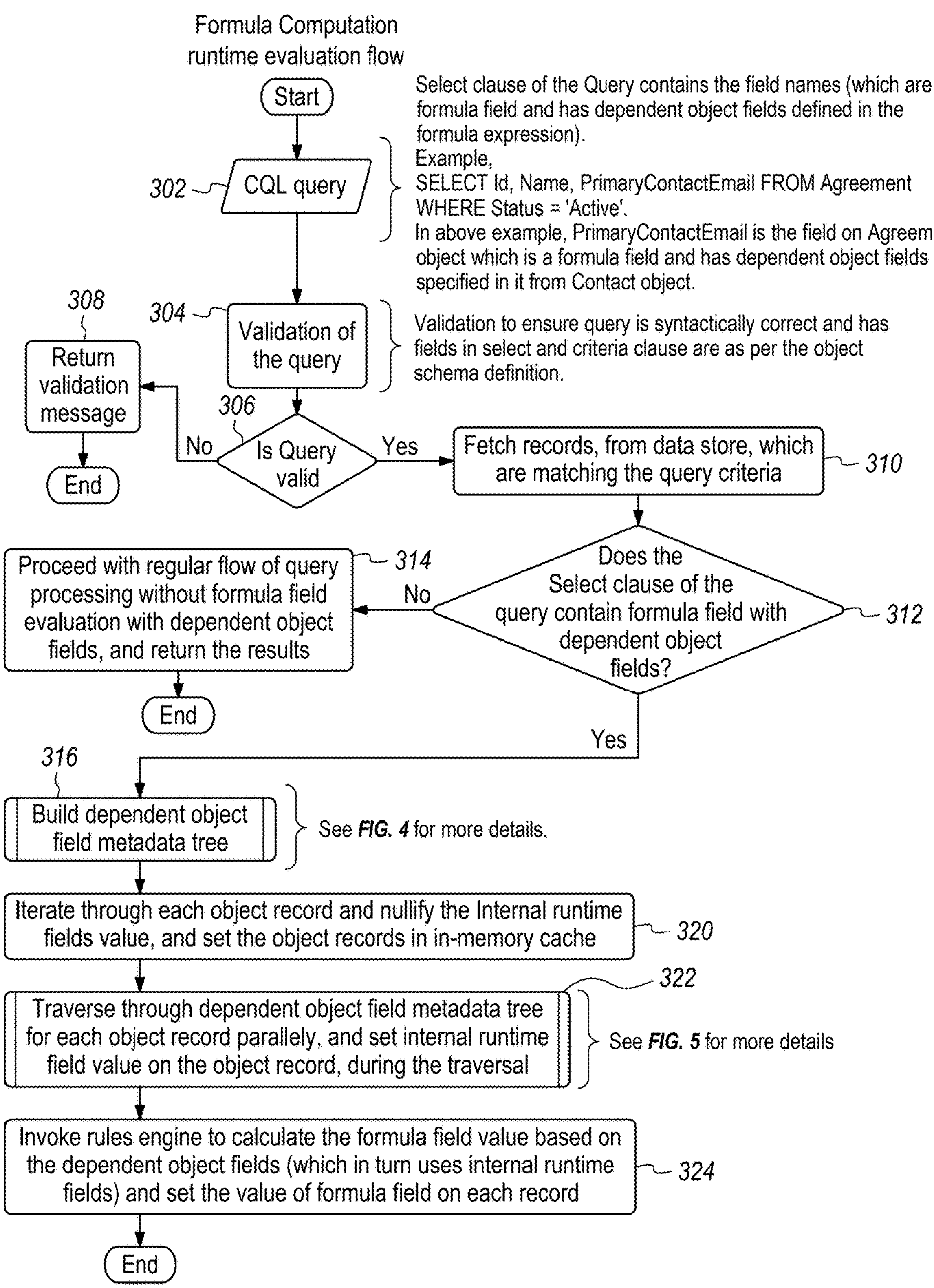
FIG. 3 is a flowchart that illustrates a runtime evaluation flow of the formula computation process.

Runtime Formula Evaluation Flow (FIG. 3)

FIG. 3 illustrates the runtime formula computation process according to one embodiment. In this embodiment, the formula computation process is triggered by the receipt of a record query that includes a formula field (step 302). Upon receipt of the query, the system validates the query (step 306). If the query is invalid, it returns an error message (step 308), and, if the query is valid, it fetches records from the data store that match the query criteria, ignoring any formula field parameters at this step (step 310). The system then determines if the query includes a formula field with dependent object fields. If not, it proceeds with the regular flow of query processing without the steps of evaluating a formula with dependent object fields and returns the results (step 314). If the query includes a formula field with dependent object fields, it begins the process of a evaluating the formula for each of the retrieved records. This starts with building a dependent-object-field metadata tree for the formula field from the metadata file created in the process described with respect to FIG. 1 (step 316). A method for creating the metadata tree is described with respect to FIGS. 4A-4B. For each record retrieved in step 310, the internal runtime fields for the dependent object fields are initialized to null values and cached in memory for efficient access (step 320). Following this initialization, the system traverses the metadata tree concurrently for each record (step 322). During the traversal, values from the dependent objects are fetched and set in the appropriate internal runtime fields. Specifically, this process involves evaluating nodes in the metadata tree sequentially from root to leaf, retrieving values for each dependent field, and populating these values into the internal runtime fields associated with each primary record. This process is described in more detail with respect to FIG. 5.

After the traversal and runtime field population, the system invokes a rules engine to calculate the formula field value for each retrieved record (step 324). For each record, the rules engine evaluates the formula expression using the internal runtime values populated for that record. The rules engine systematically substitutes the retrieved dependent field values (i.e., the internal runtime values) into the formula expression, applying the specified logical or mathematical operations to accurately compute the final values of each formula field.

Upon successful computation by the rules engine, the computed values are stored in the corresponding formula fields within each respective primary data record (also step 324). Thus, the retrieved records now include accurate, up-to-date formula values reflecting the current state of their dependent data. The finalized records, complete with computed formula values, are ready for subsequent query processing.

Where the formula field is being computed for multiple data records, the runtime evaluation process is performed in parallel for the data records. Furthermore, if a data object has multiple formula fields, the formula fields are evaluated in parallel.

This structured approach to formula evaluation, which involves leveraging a metadata-driven tree, caching of intermediate results (see FIG. 5), and parallel processing of records during runtime, markedly enhances the speed, accuracy, and scalability of formula computation within complex, multi-object environment.

In the runtime process described with respect to FIG. 3, formula evaluation was triggered by receipt of a read request (i.e., a datastore query). However, in certain embodiments, formula evaluation may be triggered upon the creation or update of a record having a formula field. For objects with a lot writes, performing the formula evaluation in response to the creation or update of a record may be more efficient than performing the evaluation in response to a read request.

Figure 4A:
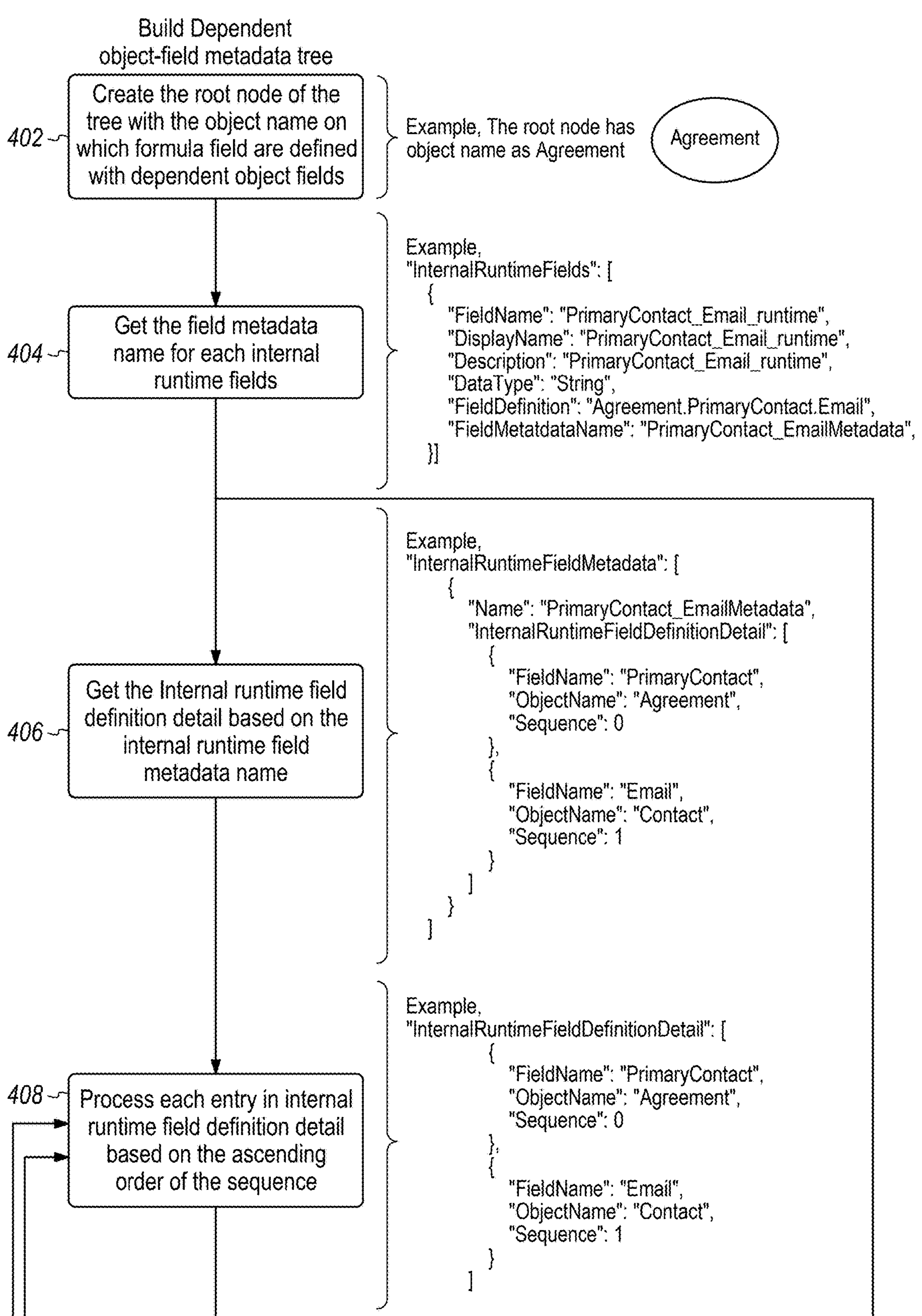
FIGS. 4A-4B are a flowchart that illustrates a method for building the dependent object field metadata tree.
Figure 4B:
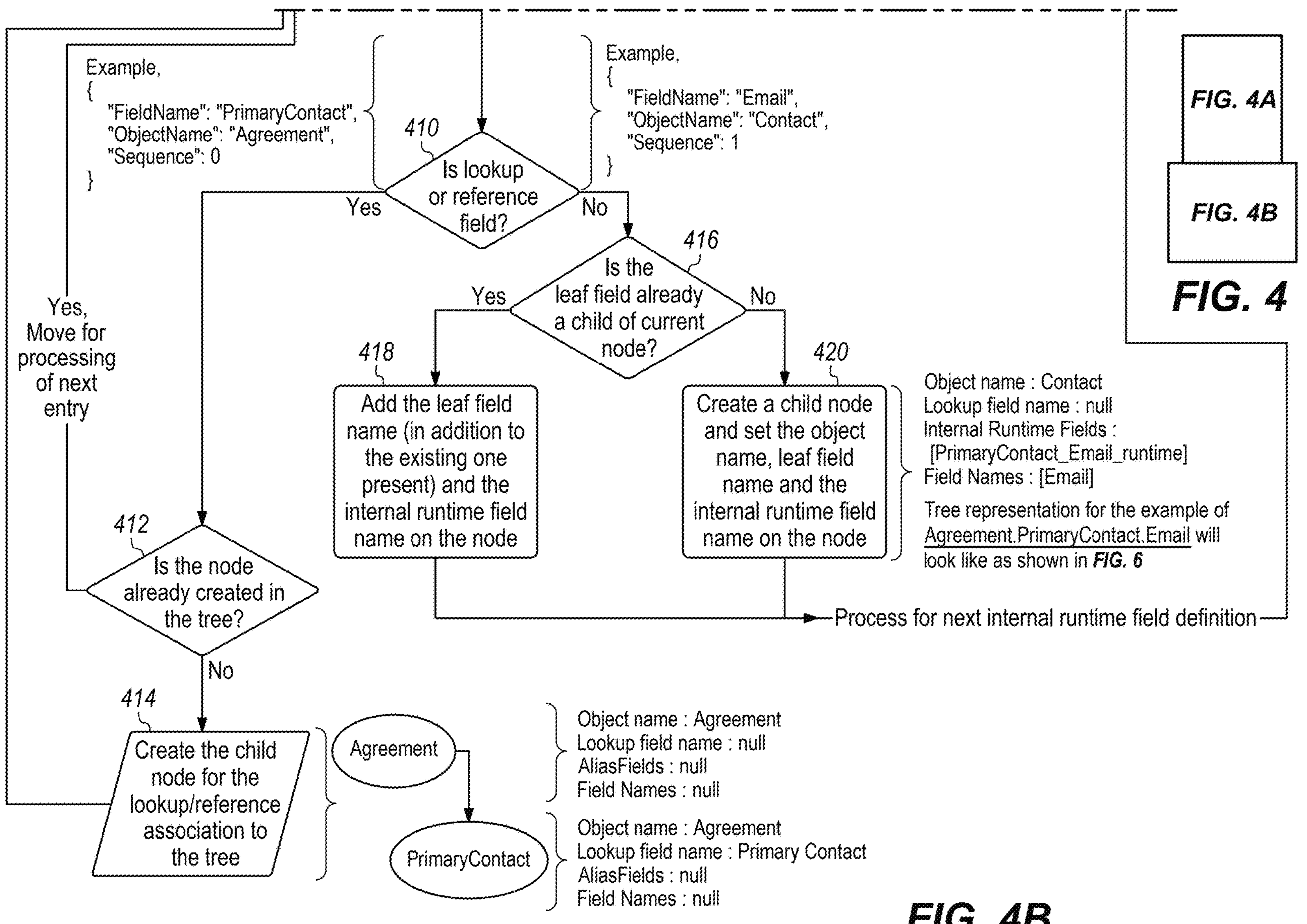

Dependent-Object-Field Metadata Tree Construction (FIGS. 4A and 4B)

FIGS. 4A and 4B illustrate a method for creating a dependent-object-field metadata tree. As shown in FIG. 4A, the metadata tree construction begins with creating a root node with the name of the primary object associated with the formula computation (e.g., Agreement) (step 402). The system retrieves the field metadata names corresponding to the internal runtime fields involved (step 404) and then retrieves the internal runtime field definition details based on the internal runtime field metadata name (step 406). Each field entry in an internal runtime field definition detail is processed based on the ascending order of sequence (step 408). These processing steps are set forth in FIG. 4B.

For each field entry processed, the system determines whether the field is a lookup or reference field (e.g., PrimaryContact) (step 410). If it is, it determines whether a node already exists in the tree for the field (step 412). If exists in the tree, it moves on to processing the next field entry in the internal runtime field definition detail. If the node does not already exist in the tree, a child node for the lookup/reference field is created and properly linked within the metadata tree (step 414).

Figure 6:
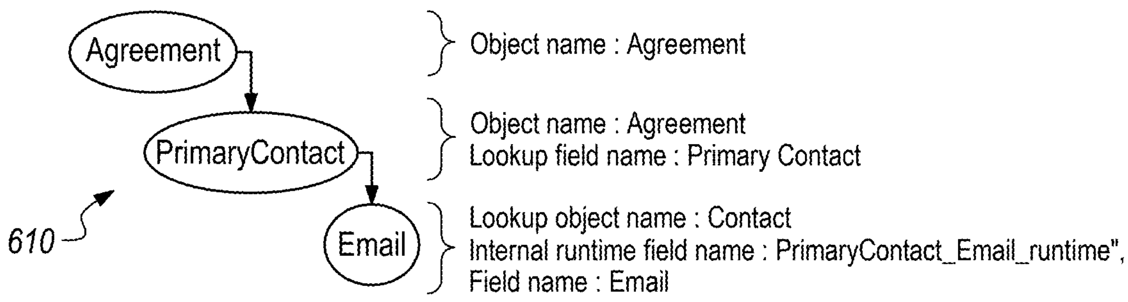
FIG. 6 is an example of a dependent-object-field metadata tree.

Returning to the evaluation step 410, if the field entry being processed is not a lookup or reference field, then it is a leaf field, and the system proceeds to evaluate the leaflevel field. Specifically, the system determines if the leaf field is a child of a current node (step 416). If so, it adds the leaf field name (in addition to the existing one present) and the internal runtime field name to the node (step 418). If the leaf field is not a child of a current node, it creates a child node (properly linked within the metadata tree) and sets the object name, leaf field name, and internal runtime field name on the node (step 420). For the example formula expression used throughout the figures ("Agreement.PrimaryContact.E-mail"), the resulting metadata tree 610 is illustrated in FIG. 6.

Figure 5:
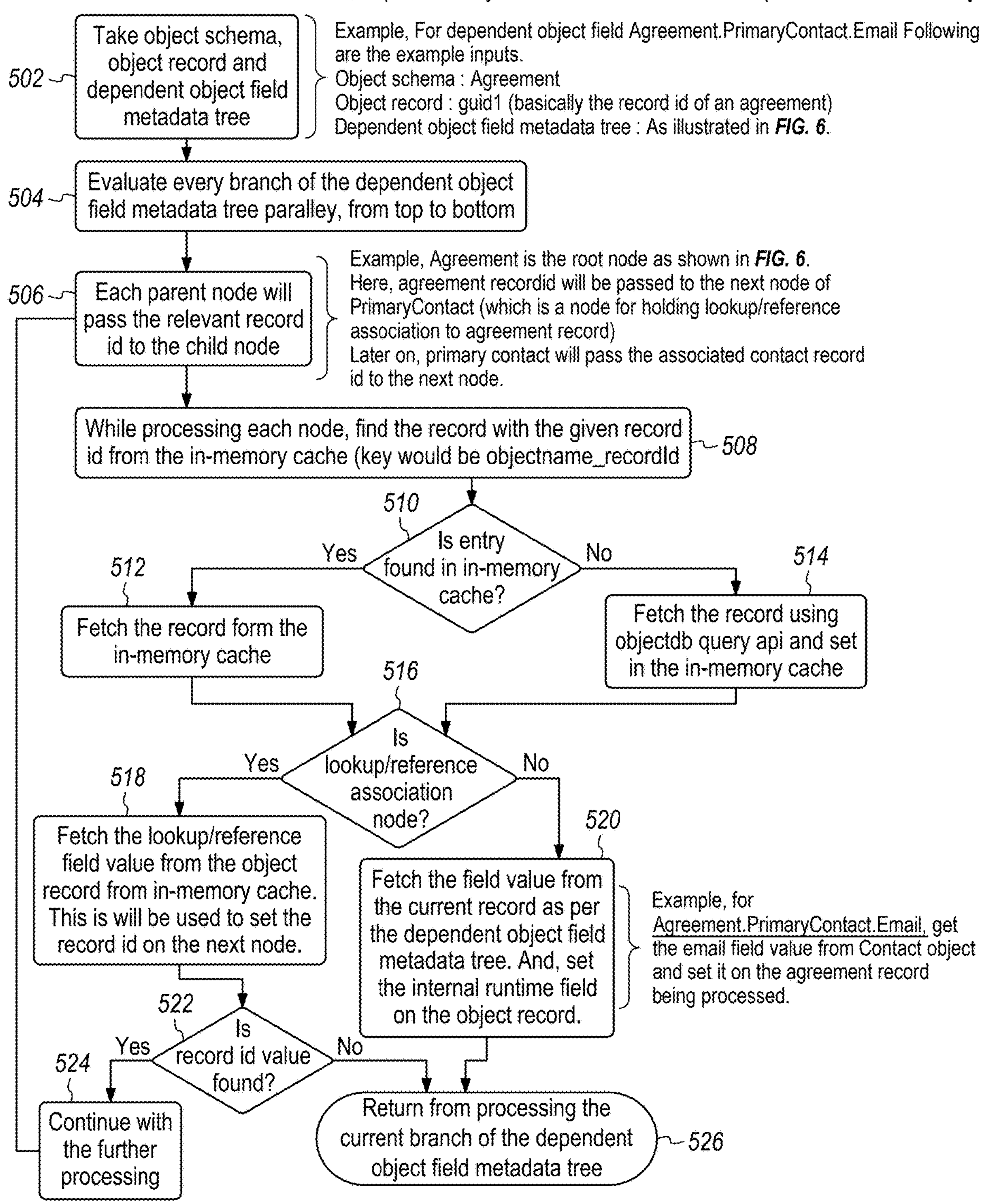
FIG. 5 is a flowchart that illustrates the formula field evaluation process by traversing the dependent-object-field metadata tree.

Formula Evaluation Through Metadata Tree Traversal (FIG. 5)

FIG. 5 illustrates a method for traversing the dependent-object-field metadata tree to retrieve values for each dependent object field and populate these values into the internal runtime fields associated with the applicable primary record (i.e., the record for which the formula is being calculated). The process is performed in parallel for each record for which the formula is being calculated. The input to the process is the primary object data schema, the applicable record ID, and the metadata tree. The system traverses each branch of the metadata tree from top (root node) to bottom in parallel, with each parent node passing record identifiers to child nodes (steps 504-506). As the system processes each node, it retrieves the record associated with the node from an in-memory cache using the provided record IDs or, if unavailable in the cache, from the datastore (steps 508-514). Records retrieved from the datastore are cached. In steps 516-524, nodes are evaluated according to their type. Specifically, at step 516, the node type is determined (lookup/reference node or leaf node). Lookup/reference nodes pass extracted record identifiers to subsequent nodes (steps 518-524). For primitive datatype nodes (i.e., leaf nodes), which correspond to dependent object fields, dependent object field values are directly retrieved from applicable dependent records and the corresponding internal runtime fields of the primary records are set to the retrieved values (step 520). The branch processing is then complete (step 526).

General

The methods described with respect to FIGS. 1-6 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A computer-implemented method for efficient formula computation in a database with an extensible data model, the method comprising:

receiving a formula expression for a formula field in a first data object, wherein the formula expression references at least one field from one other data object ("a dependent object field");

creating a metadata file with: (1) an internal runtime field defined for each dependent object field used in the formula expression and (2) dependency metadata indicating relationship(s) between the first data object and the dependent object(s);

in response to a triggering event to calculate the formula field value for a data record of the first data object, performing the following:

building a dependent object field metadata tree for the formula field using the dependency metadata in the metadata file;

traversing the metadata tree to retrieve a value for each dependent object field value;

for each dependent object field value retrieved, setting the corresponding internal runtime field value for the data record to the retrieved value;

calculating the formula field value for the data record by evaluating the formula expression using the data record's internal runtime field values for the dependent object fields; and writing the formula field value to the data record.

2. The method of claim 1, wherein the trigger event is the creation or update of the data record.

3. The method of claim 1, wherein the trigger event is retrieval of the data record.

4. The method of claim 1, wherein in response to the trigger event applying to a plurality of data records, the formula field value is computed in parallel for each data record.

5. The method of claim 1, wherein in response to the first data object having a plurality of formula fields, each formula field value is calculated in parallel in response to the trigger event.

6. The method of claim 1, wherein the database is a NoSQL database without object join capability.

7. The method of claim 1, wherein the formula expression is a mathematical or logical expression with a plurality of fields, including at least one dependent object field.

8. A non-transitory computer-readable medium comprising a computer program, that, when executed by a computer system, enables the computer system to perform the following method for efficient formula computation in a database with an extensible data model, the method comprising:

receiving a formula expression for a formula field in a first data object, wherein the formula expression references at least one field from one other data object ("a dependent object field");

creating a metadata file with: (1) an internal runtime field defined for each dependent object field used in the formula expression and (2) dependency metadata indicating relationship(s) between the first data object and the dependent object(s);

in response to a triggering event to calculate the formula field value for a data record of the first data object, performing the following:

building a dependent object field metadata tree for the formula field using the dependency metadata in the metadata file;

traversing the metadata tree to retrieve a value for each dependent object field value;

for each dependent object field value retrieved, setting the corresponding internal runtime field value for the data record to the retrieved value;

calculating the formula field value for the data record by evaluating the formula expression using the data record's internal runtime field values for the dependent object fields; and writing the formula field value to the data record.

9. The non-transitory computer-readable medium of claim 8, wherein the trigger event is the creation or update of the data record.

10. The non-transitory computer-readable medium of claim 8, wherein the trigger event is retrieval of the data record.

11. The non-transitory computer-readable medium of claim 8, wherein in response to the trigger event applying to a plurality of data records, the formula field value is computed in parallel for each data record.

12. The non-transitory computer-readable medium of claim 8, wherein in response to the first data object having a plurality of formula fields, each formula field value is calculated in parallel in response to the trigger event.

13. The non-transitory computer-readable medium of claim 8, wherein the database is a NoSQL database without object join capability.

14. The non-transitory computer-readable medium of claim 8, wherein the formula expression is a mathematical or logical expression with a plurality of fields, including at least one dependent object field.

15. A computer system for efficient formula computation in a database with an extensible data model, the system comprising:

one or more processors;

one or more memory units coupled to the one or more processors, wherein the one or more memory units store instructions that, when executed by the one or more processors, cause the system to perform the operations of:

receiving a formula expression for a formula field in a first data object, wherein the formula expression references at least one field from one other data object ("a dependent object field");

creating a metadata file with: (1) an internal runtime field defined for each dependent object field used in the formula expression and (2) dependency metadata indicating relationship(s) between the first data object and the dependent object(s);

in response to a triggering event to calculate the formula field value for a data record of the first data object, performing the following:

building a dependent object field metadata tree for the formula field using the dependency metadata in the metadata file;

traversing the metadata tree to retrieve a value for each dependent object field value;

for each dependent object field value retrieved, setting the corresponding internal runtime field value for the data record to the retrieved value;

calculating the formula field value for the data record by evaluating the formula expression using the data record's internal runtime field values for the dependent object fields; and writing the formula field value to the data record.

16. The system of claim 15, wherein the trigger event is the creation or update of the data record.

17. The system of claim 15, wherein the trigger event is retrieval of the data record.

18. The system of claim 15, wherein in response to the trigger event applying to a plurality of data records, the formula field value is computed in parallel for each data record.

19. The system of claim 15, wherein in response to the first data object having a plurality of formula fields, each formula field value is calculated in parallel in response to the trigger event.

20. The system of claim 15, wherein the database is a NoSQL database without object join capability.

21. The system of claim 15, wherein the formula expression is a mathematical or logical expression with a plurality of fields, including at least one dependent object field.

* * * * *